(12) United States Patent
Scheer et al.

(10) Patent No.: US 10,332,024 B2
(45) Date of Patent: Jun. 25, 2019

(54) MODELING SUPERCONDUCTING QUANTUM CIRCUIT SYSTEMS

(71) Applicant: Rigetti & Co., Inc., Berkeley, CA (US)

(72) Inventors: Michael Justin Gerchick Scheer, Oakland, CA (US); Maxwell Benjamin Block, Oakland, CA (US)

(73) Assignee: Rigetti & Co, Inc., Berkeley, CA (US)

( * ) Notice: Subject to any disclaimer, the term of this patent is extended or adjusted under 35 U.S.C. 154(b) by 0 days.

(21) Appl. No.: 15/902,739

(22) Filed: Feb. 22, 2018

(65) Prior Publication Data
US 2018/0240035 A1    Aug. 23, 2018

Related U.S. Application Data

(60) Provisional application No. 62/462,226, filed on Feb. 22, 2017, provisional application No. 62/467,345, filed on Mar. 6, 2017.

(51) Int. Cl.
*G06N 10/00* (2019.01)
*G06N 5/00* (2006.01)
(Continued)

(52) U.S. Cl.
CPC ......... *G06N 10/00* (2019.01); *G01R 33/0358* (2013.01); *G06F 15/82* (2013.01);
(Continued)

(58) Field of Classification Search
None
See application file for complete search history.

(56) References Cited

U.S. PATENT DOCUMENTS 5,379,231 A † 1/1995 Pillage
2009/0077001 A1 † 3/2009 Macready et al.
(Continued)

FOREIGN PATENT DOCUMENTS

CN    103942416    † 7/2014
WO    2018004636 A1 † 1/2018

OTHER PUBLICATIONS

Brune, Otto; "Synthesis of a Finite Two-terminal Network Whose Driving-point Impedance is a Prescribed Function of Frequency," Doctoral Thesis from the Massachusetts Institute of Technology, dated Jan. 1932, 134 pages.
(Continued)

*Primary Examiner* — Jany Richardson
(74) *Attorney, Agent, or Firm* — Henry Patent Law Firm PLLC

(57) ABSTRACT

In a general aspect, a superconducting quantum circuit system is modeled. In some aspects, a graph representing a quantum circuit system is generated. The graph includes vertices and edges; the edges represent circuit elements of the quantum circuit system, and the vertices represent physical connections between the circuit elements. Inverse inductances, conductances, capacitances, and junction inverse inductances are assigned to respective edges of the graph based on a lumped-element approximation of the quantum circuit system. A coordinate system is determined based on the graph, and a matrix representation of the system is determined based on the coordinate system. A Hamiltonian for the quantum circuit system is determined using the matrix representation, and the quantum circuit system is simulated based on the Hamiltonian.

39 Claims, 5 Drawing Sheets

(51) Int. Cl.
| | |
|---|---|
| *H03K 19/195* | (2006.01) |
| *G06F 15/82* | (2006.01) |
| *G01R 33/035* | (2006.01) |
| *H01L 39/22* | (2006.01) |
| *G06F 17/21* | (2006.01) |
| *H01L 27/18* | (2006.01) |
| *G06F 17/50* | (2006.01) |

(52) U.S. Cl.
CPC ........ *G06F 17/215* (2013.01); *G06F 17/5009* (2013.01); *G06N 5/003* (2013.01); *H01L 27/18* (2013.01); *H01L 39/223* (2013.01); *H03K 19/195* (2013.01); *G06F 2217/68* (2013.01)

(56) References Cited

U.S. PATENT DOCUMENTS

2012/0069414 A1† 3/2012 Nakamura et al.
2016/0335560 A1† 11/2016 Mohseni et al.
2017/0228483 A1 8/2017 Rigetti et al.

OTHER PUBLICATIONS

ANSYS, "ANSYS Q3D Extractor", http://www.ansys.com/-/media/Ansys/corporate/resourcelibrary/brochure/ansys-q3dextractor-brochure-160.pdf, Dated 2015, 2 pgs.

Gustavsen, et al., "Rational approximation of frequency domain responses by vector fitting", IEEE Trans. Power Delivery, vol. 14, Jul. 1999, 10 pgs.

Nigg, S. E, et al., "Black-box superconducting circuit quantization", Phys. Rev. Lett., 108, 240502, Jun. 2012, 5 pgs.

Solgun, F., et al., "Blackbox quantiztion of superconducting circuits using exact impedance synthesis", Phys. Rev. B, 90, 134504, Oct. 2014, 18 pgs.

Vool, et al., "Introduction to quantum electromagnetic circuits", arXiv:1610.03438v1, Oct. 11, 2016, 59 pages.

Henrik Lund Mortensen, Klaus Molmer and Christian Kraglund Andersen, Normal modes of a superconducting transmission-line resonator with embedded lumped element circuit components, Jul. 18, 2016, Department of Physics and Astronomy, Aarhus University, DK-8000 Aarhus C, Denmark.†

Garnet Jason Vaz, Graph Based Scalable Algorithms with Applications, UC Merced Electronic Theses and Dissertations, Publication: 2014, https://escholarship.org/uc/item/266130xp.†

J D Cresser, Matrix Representations of State Vectors and Operators, Chapter 12, 2009.†

Yatish Patel, Communication and Control for Quantum Circuits, May 14, 2010, Dissertation submitted to the University of CA, Berkeley.†

Massoud Pedram and Alireza Shafaei, Layout Optimization for Quantum Circuits with Linear Nearest Neighbor Architectures, Publication: Date May 24, 2016, IEEE Circuits and Systems Magazine.†

† cited by third party

MODELING SUPERCONDUCTING QUANTUM CIRCUIT SYSTEMS

CROSS-REFERENCE TO RELATED APPLICATIONS

This application claims priority to U.S. Provisional Application No. 62/462,226 entitled "Modeling Superconducting Quantum Circuit Systems," filed Feb. 22, 2017; and to U.S. Provisional Application No. 62/467,345 entitled "Modeling Superconducting Quantum Circuit Systems," filed Mar. 6, 2017. Both priority documents are hereby incorporated by reference.

BACKGROUND

The following description relates to modeling superconducting quantum circuit systems.

Superconducting quantum circuit systems can be fabricated on chips and used for processing quantum information. For example, superconducting electronic circuits that include superconducting qubit devices coupled to resonators can be used for quantum information processing. The superconducting qubit devices can be implemented, for example, using Josephson-junction devices.

DETAILED DESCRIPTION

Superconducting circuits with Josephson junctions provide a platform for solid state quantum computation. For example, large scale quantum computers can be implemented using superconducting circuits involving dozens of qubits and resonators on a single chip. In some aspects of what is described here, computer-implemented systems can be improved (e.g., in terms of simulation time, accuracy, and transparency) to model and simulate superconducting quantum circuit chips of greater complexity. In some implementations, a simulation and design tool utilizes electrostatic capacitance extraction that is fast and can be easily calibrated to accurately predict measured results. The simulation and design tool can utilize a lumped-element approximation of the system and represent the system as a graph, and a model (e.g., a system Hamiltonian) can be generated from the graph and used to analyze the system.

In some aspects of what is described here, technical advantages and improvements are achieved. For example, a computer-implemented modeling tool may provide (1) fast simulations that capture important linear and nonlinear modes of a superconducting quantum circuit chip; (2) an understandable representation of the chip, for example, that allows a designer to understand how to improve the design; (3) access to physically meaningful parameters that can be calibrated with measurement; or (4) a combination of these and other advantages. In some instances, the techniques described here can reduce or eliminate the use of multiport impedance simulations using a full-wave electromagnetics solver, which can be costly in time and memory.

Figure 1:
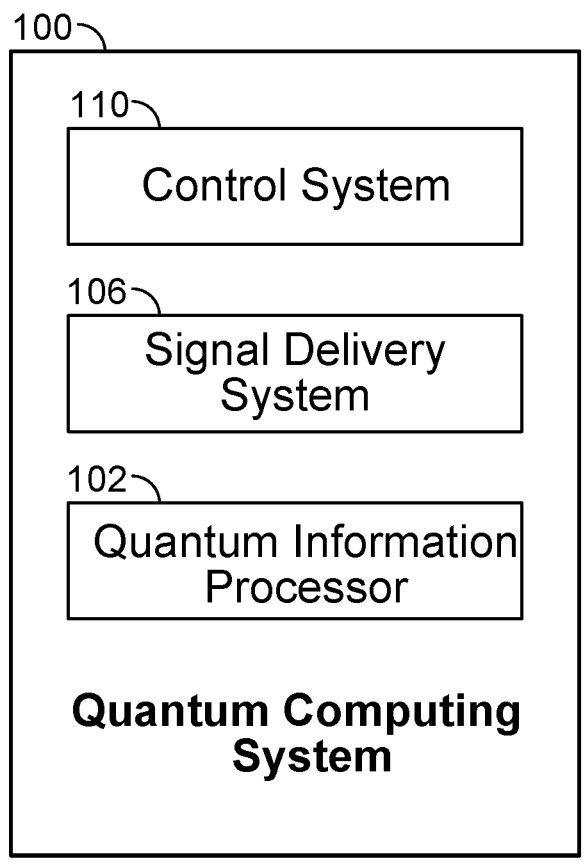
FIG. 1 is a bock diagram of an example quantum computing system.

FIG. 1 is a schematic diagram of an example quantum computing system 100. The example quantum computing system 100 shown in FIG. 1 includes a control system 110, a signal delivery system 106, and a quantum information processor 102. A quantum computing system may include additional or different features, and the components of a quantum computing system may operate as described with respect to FIG. 1 or in another manner.

The example quantum computing system 100 shown in FIG. 1 can perform quantum computational tasks by executing quantum algorithms. In some implementations, the quantum computing system 100 can perform quantum computation by storing and manipulating information within individual quantum states of a composite quantum system. For example, qubits (i.e., quantum bits) can be stored in and represented by an effective two-level sub-manifold of a quantum coherent physical system. Control devices (e.g., coupler devices) can be used to perform quantum logic operations on single qubits or conditional quantum logic operations on multiple qubits. In some instances, the conditional quantum logic can be performed in a manner that allows large-scale entanglement within the quantum computing device. Control signals can manipulate the quantum states of individual qubits and the joint states of multiple qubits. In some instances, information can be read out from the composite quantum system by measuring the quantum states of the individual qubits.

In some implementations, the quantum computing system 100 can operate using gate-based models for quantum computing. For example, topological quantum error correction schemes can operate on a lattice of nearest-neighbor-coupled qubits. In some instances, these and other types of quantum error correcting schemes can be adapted for a two- or three-dimensional lattice of nearest-neighbor-coupled qubits, for example, to achieve fault-tolerant quantum computation. The lattice can allow each qubit to be independently controlled and measured in some cases. Adjacent pairs of qubits in the lattice can be addressed, for example, with two-qubit gate operations that are capable of generating entanglement, independent of other pairs in the lattice.

In some implementations, the quantum computing system 100 can operate using adiabatic models for quantum computing. For instance, the qubits can be initialized in an initial state, and the controlling Hamiltonian can be transformed adiabatically by adjusting control parameters to another state that can be measured to obtain an output of the quantum computation.

In some implementations, the quantum computing system 100 is constructed and operated according to a scalable quantum computing architecture. For example, in some cases, the architecture can be scaled to a large number of qubits to achieve large-scale general purpose coherent quantum computing.

The example quantum information processor 102 shown in FIG. 1 includes qubit devices that are used to store and process quantum information. The quantum information processor 102 shown in FIG. 1 can include, for example, qubit devices arranged in a two-dimensional or three-dimensional array with other circuit devices. In some cases, the quantum information processor 102 includes a superconducting circuit, and the qubit devices are implemented as circuit devices (e.g., transmon devices, fluxonium devices, etc.) that include superconducting quantum interference device (SQUID) loops.

In the example quantum information processor 102, the qubit devices each store a single qubit (a bit of quantum information), and the data qubits can collectively define a computational state for a quantum computation. The quantum information processor 102 may also include readout devices that interact with the qubit devices to detect their quantum states. For example, the readout devices may generate readout signals that indicate the computational state. The quantum information processor 102 may also include coupler devices that selectively operate on individual qubits or pairs of qubits. For example, the coupler devices may be operated to produce entanglement over two or more qubits in the quantum information processor 102.

In some implementations, the example quantum information processor 102 can process the quantum information stored in the data qubits by applying control signals to the qubit devices or to other control devices in the quantum information processor 102. In some examples, the operations can be expressed as single-qubit gates, two-qubit gates, or other types of logical gates that operate on one or more qubits. A sequence of quantum logic operations can be applied to the qubits to perform a quantum computation. The quantum computation may correspond to a quantum simulation or another type of quantum algorithm.

In the example quantum computing system 100 shown in FIG. 1, the control system 110 controls operation of the quantum information processor 102. The example control system 110 may include data processors, signal generators, interface components and other types of systems or subsystems. In some cases, the control system 110 includes one or more classical computers or classical computing components.

In some implementations, the control system 110 generates a quantum logic control sequence based on a quantum computation to be performed. The quantum logic control sequence can include a sequence of quantum logic operations that can be executed by the quantum information processor 102. The quantum logic control sequence may be converted to control signals (e.g., microwave control signals, optical control signals, DC bias control signals, etc.) that are delivered to the quantum information processor 102, and upon delivery, cause the quantum information processor 102 to execute the quantum computation.

In the example shown in FIG. 1, the signal delivery system 106 provides communication between the control system 110 and the quantum information processor 102. For example, the signal delivery system 106 can receive control signals (e.g., qubit control signals, readout control signals, coupler control signals, etc.) from the control system 110 and deliver the control signals to the quantum information processor 102. In some instances, the signal delivery system 106 performs preprocessing, signal conditioning, or other operations to the control signals before delivering them to the quantum information processor 102.

The signal delivery system 106 may include signal lines, signal processing hardware, filters, feedthrough devices, or a combination of these and other types of components. In some implementations, the signal delivery system 106 provides connections between different temperature and noise regimes. For example, the quantum computing system 100 may include a series of temperature stages between a higher temperature regime of the control system 110 and a lower temperature regime of the quantum information processor 102.

The quantum information processor 102, and in some cases all or part of the signal delivery system 106, can be maintained in a controlled environment. The environment can be provided, for example, by shielding equipment, cryogenic equipment, and other types of environmental control systems. In some examples, the components in the quantum information processor 102 operate in a cryogenic temperature regime and are subject to very low electromagnetic and thermal noise. For example, magnetic shielding can be used to shield the system components from stray magnetic fields, optical shielding can be used to shield the system components from optical noise, thermal shielding and cryogenic equipment can be used to maintain the system components at controlled temperature, etc.

Figure 2:
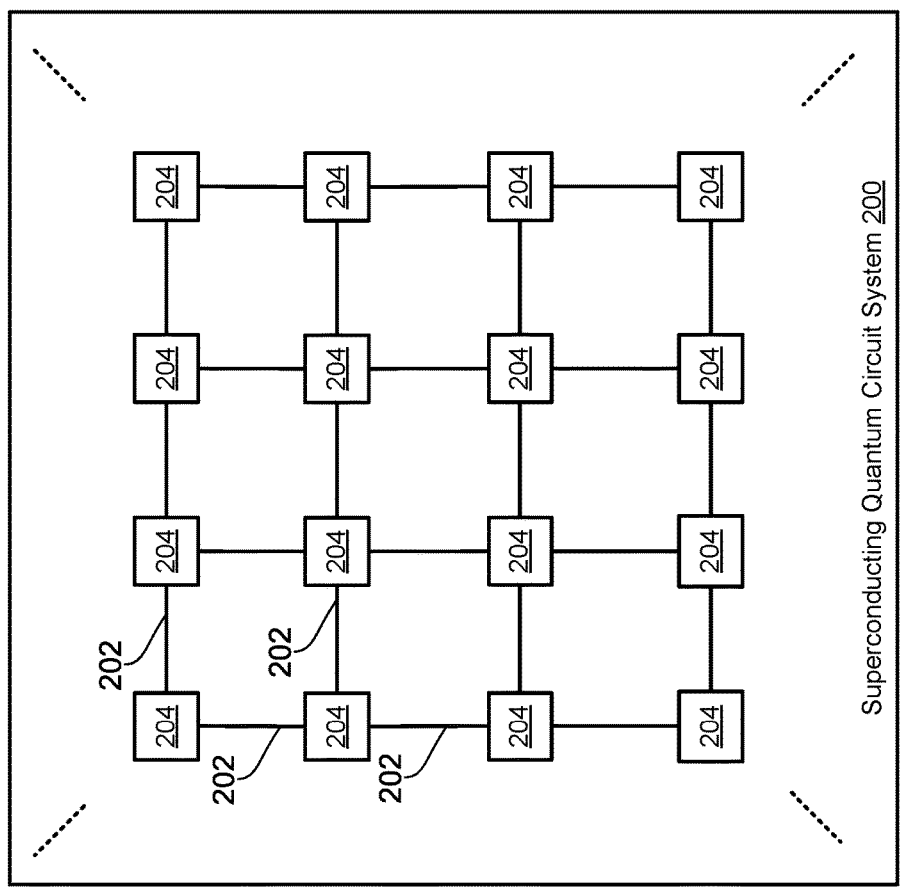
FIG. 2 is a block diagram of an example computer system and an example superconducting quantum circuit system.
Figure 2:
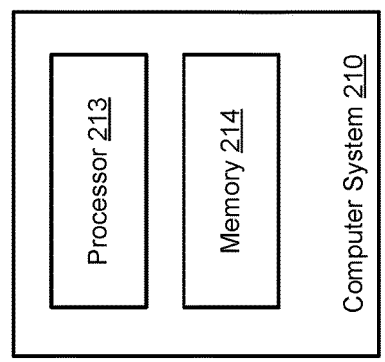

FIG. 2 is a block diagram of an example computer system 210 and an example superconducting quantum circuit system 200. The example superconducting quantum circuit system 200 includes circuit devices 204 arranged in a two-dimensional device array. Sixteen circuit devices are shown in FIG. 2—the circuit devices 204 may include qubit devices, coupler devices arranged between neighboring pairs of the qubit devices, readout devices arranged in proximity to the qubit devices, or a combination of these and other types of circuit devices.

The circuit devices 204 in the quantum circuit system 200 may be arranged in one or more regular or irregular arrays. For instance, qubit devices may be arranged in a rectilinear (e.g., rectangular or square) array that extends in two spatial dimensions (in the plane of the page), where each qubit device has four nearest-neighbor qubit devices. Qubit devices can be arranged in another type of regular or irregular array (e.g., a hexagonal array). In some instances, the array of circuit devices 204 also extends in a third spatial dimension (in/out of the page), for example, to form a cubic array or another type of regular or irregular three-dimensional array. The quantum circuit system 200 may include additional devices, including additional qubit devices, coupler devices and other types of devices.

The example quantum circuit system 200 also includes connections 202 between neighboring pairs of the circuit devices 204. The connections 202 can provide electromagnetic communication between the connected circuit devices. In some cases, the connections 202 are implemented as capacitive or conductive connections. For instance, the connections 202 may include metal traces, capacitors and other components. The superconducting circuit devices 204 may be operated by microwave signals delivered in the quantum circuit system 200, for example, from an external control system. Signals may be exchanged among the circuit devices 204 through the connections 202 or other signal pathways in the quantum circuit system 200.

In some cases, the superconducting quantum circuit system 200 includes qubit devices coupled to respective resonator devices, where each qubit device includes one or more Josephson junctions. In some cases, a qubit device may include a superconducting quantum interference device (SQUID) loop that is capacitively coupled to a neighboring resonator device. For example, the superconducting quantum circuit system 202 may include multiple pairs of resonator and qubit devices, each similar to the devices represented in FIG. 4.

The computer system 210 can be implemented as a classical computer that stores and processes information as classical bits, in some cases. In some implementations, the computer system 210 includes a simulation tool that can model and simulate the superconducting quantum circuit system 200. For example, the computer system 210 may generate a model and perform simulations based on the example process 300 shown in FIG. 3.

The example computer system 210 includes a processor 213 and a memory 214. The memory 214 can include, for example, a random access memory (RAM), a storage device (e.g., a writable read-only memory (ROM) or others), a hard disk, or another type of storage medium. The memory 214 can include various forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The computer system 210 can be preprogrammed or it can be programmed (and reprogrammed) by loading a program from another source (e.g., from another computer device through a data network, or in another manner). The memory 214 can store instructions (e.g., computer code) associated with an operating system, computer applications, and other resources. The memory 214 can also store application data and data objects that can be interpreted by one or more applications or virtual machines running on the computer system 210.

The computer system 210 may include a keyboard, monitor, and other types of input or output devices (e.g., mouse, touchpad, touchscreen, microphone, motion sensors, etc.). The computer system 210 may be connected to a communication link, which may include any type of communication channel, connector, data communication network, or other link. For example, the communication link can include a wireless or a wired network, a Local Area Network (LAN), a Wide Area Network (WAN), a private network, a public network (such as the Internet), or another type of data communication network.

The memory 214 can store programs, which may include software applications, scripts, programs, functions, executables, or other modules that are interpreted or executed by the processor(s) 213. Such applications may include machine-readable instructions for performing one or more of the operations represented in FIG. 3. Programs may obtain input data from the memory 214, from another local source, or from one or more remote sources (e.g., via a communication link). Programs may generate output data and store the output data in the memory 214, in another local medium, or in one or more remote devices (e.g., by sending the output data via the communication link). Programs (also known as, software, software applications, scripts, or codes) can be written in any form of programming language, including compiled or interpreted languages, declarative or procedural languages. A computer program can be deployed to be executed on one computer or on multiple computers that are located at one site or distributed across multiple sites and interconnected by a communication network.

The processor(s) 213 can include any type of data processor that executes instructions, for example, to generate output data based on data inputs. For example, the processor(s) 213 can run programs by executing or interpreting the scripts, functions, executables, or other modules. The processor(s) 213 may perform one or more of the operations represented in FIG. 3.

The processor(s) 213 can include various kinds of apparatus, devices, and machines for processing data, including, by way of example, a programmable data processor, a system on a chip, or multiple ones, or combinations, of the foregoing. The processor(s) 213 can include special purpose logic circuitry, e.g., an FPGA (field programmable gate array) or an ASIC (application specific integrated circuit). The processor(s) 213 can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The processor(s) 213 can include, by way of example, both general and special purpose microprocessors, and processors of any kind of digital computer.

Figure 3:
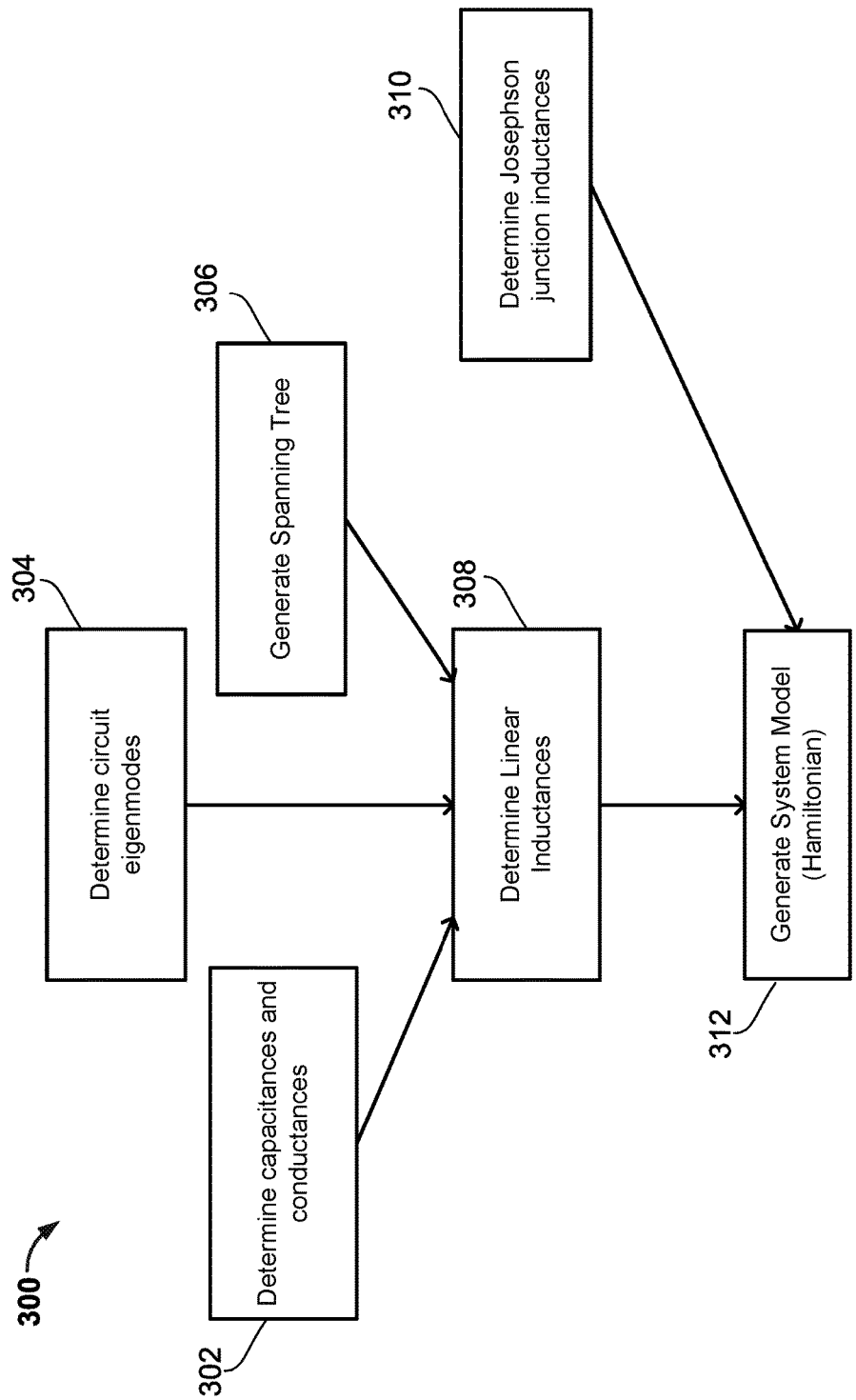
FIG. 3 is a flow chart showing an example process for generating a model of a superconducting quantum circuit system.

FIG. 3 is a flow chart showing an example process 300 for generating a model of a superconducting quantum circuit system such as, for example, the superconducting quantum circuit system 200 shown in FIG. 2 or another type of superconducting quantum circuit system. The example process 300 may include additional or different operations, and the operations may be performed in the order shown or in another order. In some cases, one or more of the operations can be performed in parallel, combined into other operations, divided into multiple operations, iterated or repeated or performed in another manner. The example process 300 can be performed by a computing system such as, for example, the example quantum computing system 100 shown in FIG. 1, the computer system 200 shown in FIG. 2 or another type of computing system. In some implementations, the process 300 includes the techniques and analysis described herein.

The example process 300 can generate a model that can be used to simulate all or part of a quantum information processor such as, for example, the quantum information processor 102 shown in FIG. 1. The process can utilize a circuit model of the superconducting quantum circuit system, and generate a graph representation of the superconducting quantum circuit system from the circuit model. For instance, the example graph shown in FIG. 5 is based on the example circuit model shown in FIG. 4. In the graph representation, each vertex represents a piece of metal approximated to be at constant voltage, and each edge represents a circuit element (for example, a combination of conductance, astringence, capacitance and Josephson junctions or more complex circuits). As an example, each edge in the graph can represent all or part of a circuit device 204 or connection 202 shown in FIG. 2, and each vertex in the graph can represent a piece of metal at constant voltage, which is also a galvanic connection between circuit elements. Qubit modes and resonator modes may be closely associated with certain edges, or may be emergent properties of the circuit (e.g.: distributed over many vertices). The edges can also include parameters that represent other features of a classical or quantum circuit, such as, for example, a drive (current or voltage source), another external system, a black box admittance, or others.

At 302, capacitances and conductances are determined for each edge of the graph. The capacitances and conductances can be determined based on a 3-D model of the device, for example, by a computer-implemented capacitance extractor tool, such as, e.g., Q3D Extractor software available from ANSYS® of Canonsburg, Pa. In some cases, the model is modified from its physical form (e.g., certain connections to ground may be cut or otherwise modified) before applying the capacitance extractor tool. The capacitances and conductances may be determined in another manner in some cases.

At 304, eigenmodes of the superconducting quantum circuit system are determined. In some implementations, the eigenmodes are determined based on a 3D model of the superconducting quantum circuit system, for example, by a computer-implemented finite element electromagnetic structure solver, such as, e.g., HFSS available from ANSYS® of Canonsburg, Pa. In some implementations, the eigenmodes are determined based on physical measurements of the superconducting quantum circuit system, for example, by measuring responses in the superconducting quantum circuit system. The eigenmodes may be determined in another manner in some cases.

At 306, a spanning tree is generated over the graph. The spanning tree can be generated, for example, by defining a ground vertex as the root, and performing a breadth-first (or other) traversal of the graph from the root. The edges of the spanning tree can be directed toward the root node, such that all circuit elements are represented as being directed to ground. The spanning tree may be generated in another manner.

At 308, linear inductances are determined for each edge of the graph. The linear inductance value assigned to each edge indicates the linear inductance of the circuit element represented by that edge. The linear inductances can be determined using the capacitances and conductances (determined at 302), the circuit eigenmodes (determined at 304) and the spanning tree (generated at 306). In some cases, an equation of motion is defined for each vertex of the graph, and the equations of motion are combined to form a system of differential equations for the superconducting quantum circuit system. An example is described with respect to FIGS. 4 and 5. The linear inductances can then be chosen such that the eigenmodes of the system of differential equations matches the eigenmodes determined at 304. The linear inductances may be determined in another manner in some cases. In some cases, the values of the conductances and capacitances are modified after determining the linear inductances.

At 310, the Josephson junction inductances are determined for each edge of the graph. The Josephson junction inductance value assigned to each edge indicates the Josephson junction inductance of the circuit element represented by that edge. The Josephson junction inductances can be determined, for example, based on physical measurements of the superconducting quantum circuit system, for example, based on probing the Josephson junctions at room temperature. In some cases, the Josephson junction inductances can be determined based on the circuit eigenmodes, for instance, analogous to the determination of linear inductances at 308. The Josephson junction inductances may be determined in another manner in some cases.

At 312, the system model is generated based on the graph with the parameters assigned as described above. The system model can be or include a Hamiltonian for the superconducting quantum circuit system. The system model can be used to analyze the superconducting quantum circuit system. For example, the system model can be used to perform numerical or symbolic simulations, to predict system parameters (e.g., operating frequencies, dispersive shifts, anharmonicities, coherence times, etc.), to study quantum optimal control, to compute quantum or classical transfer functions (e.g., impedance matrix, scattering matrix, admittance matrix, etc.) or for other types of analysis.

Figure 4:
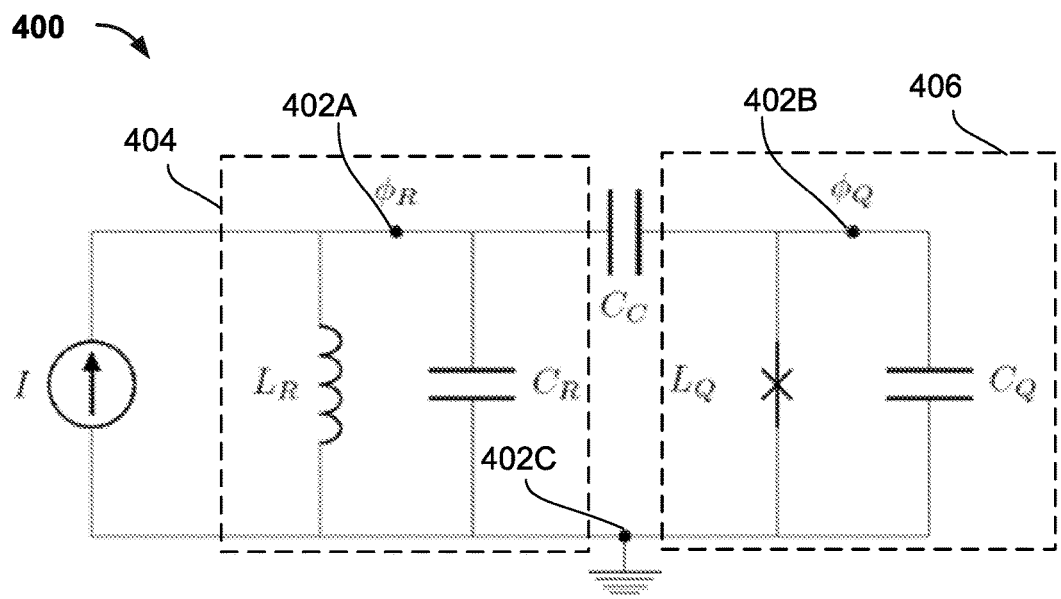
FIG. 4 is an example circuit diagram for an example superconducting quantum circuit system.
Figure 5:
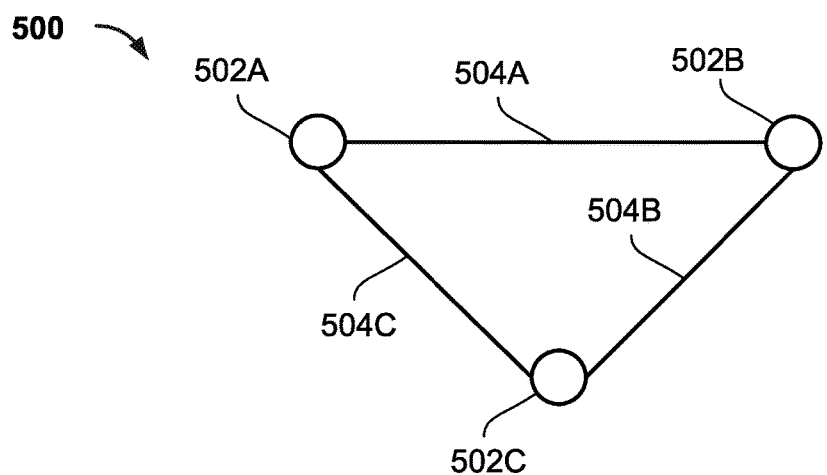
FIG. 5 is a graph representing the example circuit diagram 400 shown in FIG. 4.

FIG. 4 is an example circuit diagram 400 for an example superconducting quantum circuit system. The example circuit diagram 400 includes a current source (represented as I) connected to a resonator device 404, which is capacitively coupled to a qubit device 406. The capacitive coupling between the resonator device 404 and the qubit device 406 is represented as the capacitor $C_C$ in the circuit diagram 400. The resonator device 404 includes a linear inductance $L_R$ and a capacitance $C_R$. The qubit device 406 includes a Josephson junction inductance $L_Q$ and a capacitance $C_Q$. Three circuit nodes 402A, 402B and 402C are shown in the circuit diagram 400.

FIG. 5 is an example graph 500 that represents the example circuit diagram 400 shown in FIG. 4. The graph includes three vertices 502A, 502B, 502C and three edges 504A, 504B, 504C. Each edge in the graph 500 represents a circuit device in the circuit diagram 400, and each vertex in the graph 500 represents a connection between circuit devices. In the example shown in FIG. 5, the vertex 502A represents the node 402A that connects the resonator device 404 and the capacitor $C_C$; the vertex 502B represents the node 402B that connects the qubit device 406 and the capacitor $C_C$; the vertex 502C represents the node 402C that connects the resonator device 404 and the qubit device 406.

Values of electromagnetic parameters can be assigned to each of the edges 504A, 504B, 504C in the graph 500. For example, the electromagnetic parameters can be assigned based on values of the capacitances, conductivities, linear inductances and Josephson junction determined according to the process 300 shown in FIG. 3. In some cases, the electromagnetic parameters assigned to each edge include the astringence (A), conductance (G), capacitance (C) and junction astringence (J). Here, the astringence refers to the inverse of inductance. Values of other parameters may be assigned in some cases.

Using the circuit model 400 shown in FIG. 4 and the graph 500 shown in FIG. 5, the equations of motion can be written, for example, as $$\frac{\phi_R}{L_R} + C_R\ddot{\phi}_R + C_C(\ddot{\phi}_R - \ddot{\phi}_Q) = I \quad (1)$$

$$\frac{\phi_0}{L_Q}\sin(\phi_Q/\phi_0) + C_Q\ddot{\phi}_Q + C_C(\ddot{\phi}_Q - \ddot{\phi}_R) = 0 \quad (2)$$

which can be written in matrix form as $$A\Phi + C\ddot{\Phi} + J\phi_0\sin(\Phi/\phi_0) = D \quad (3)$$

where $$A = \begin{pmatrix} 1/L_R & 0 \\ 0 & 0 \end{pmatrix} \quad (4)$$

$$C = \begin{pmatrix} C_R + C_C & -C_C \\ -C_C & C_Q + C_C \end{pmatrix} \quad (5)$$

$$J = \begin{pmatrix} 0 & 0 \\ 0 & 1/L_Q \end{pmatrix}, D = \begin{pmatrix} I \\ 0 \end{pmatrix} \quad (6)$$

This can be represented by a Lagrangian and Hamiltonian:

$$\mathcal{L}_{(\Phi, \dot{\Phi})} = \tfrac{1}{2}\dot{\Phi}^T C\dot{\Phi} - \tfrac{1}{2}\Phi^T A\Phi + J\phi_0^2\cos(\Phi/\phi_0) + D^T\Phi \quad (7)$$

$$\mathcal{H}_{(Q, \Phi)} = \tfrac{1}{2}Q^T C^{-1}Q + \tfrac{1}{2}\Phi^T A\Phi - J\phi_0^2\cos(\Phi/\phi_0) - D^T\Phi, \quad Q = C\dot{\Phi} \quad (8)$$

Once quantized, this model can predict parameters of interest such as, for example, frequencies, dispersive shifts, lamb shifts, anharmonicities, decay rates or any other parameter or dynamic behavior of the physical system. The process described with respect to FIGS. 4 and 5 can be applied generally to larger superconducting quantum circuits that include other combinations of inductors, capacitors, resistors and Josephson junctions, for example, as described herein.

Figure 6:
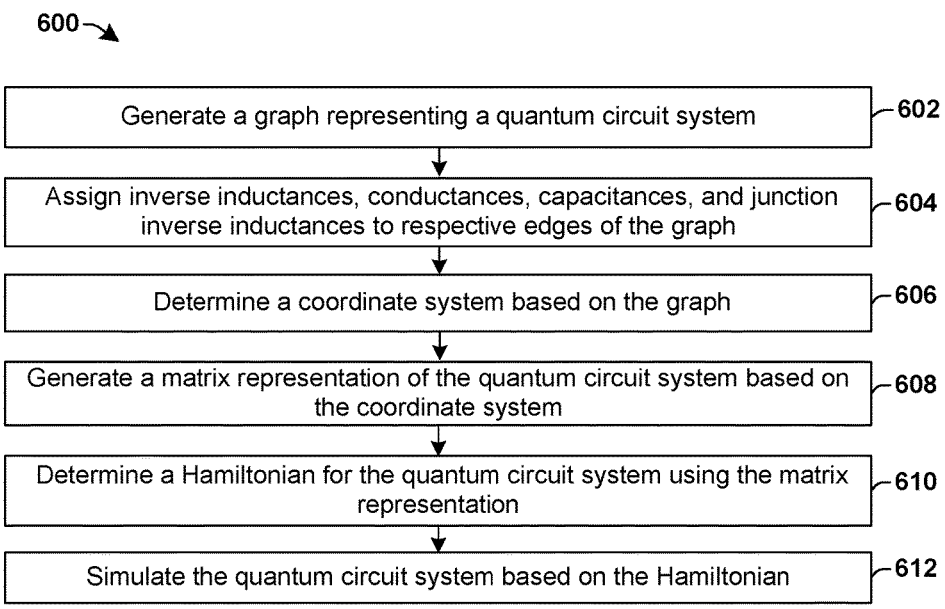
FIG. 6 is another flow chart showing an example process for modeling a superconducting quantum circuit system.

FIG. 6 is a flow chart showing an example process 600 for simulating a superconducting quantum circuit system such as, for example, the superconducting quantum circuit system 200 shown in FIG. 2 or another type of superconducting quantum circuit system. The example process 600 may include additional or different operations, and the operations may be performed in the order shown or in another order. In some cases, one or more of the operations can be performed in parallel, combined into other operations, divided into multiple operations, iterated or repeated or performed in another manner. The example process 600 can be performed by a computing system such as, for example, the example quantum computing system 100 shown in FIG. 1, the computer system 200 shown in FIG. 2 or another type of computing system. In some implementations, the process 600 includes the techniques and analysis described herein.

At 602, a graph can be generated, the graph representing a quantum circuit system. In one aspect, the graph can be generated by operation of a graph generating unit executed by one or more processors. The graph generating unit can be implemented, for example, in software, hardware, firmware or a combination of these. In another aspect, the graph includes vertices and edges, the edges representing circuit elements of the quantum circuit system and the vertices representing physical connections between the circuit elements of the quantum circuit system. The circuit elements can include, for example, one or more capacitances, inductances, conductances, Josephson junctions, current sources, voltage sources or sub-circuits, or parallel combinations of two or more of these. Here, a sub-circuit refers to a circuit which is itself one of or a combination of two or more of a capacitance, an inductance, a conductance, a Josephson junction, a current source and a voltage source. In various aspects, the graph generating unit is programmed or otherwise configured to generate a graph in accordance with and/or using aspects of equation 9 and/or equations 17-18 and related discussions, as described below.

At 604, inverse inductances (i.e., astringences), conductances, capacitances, and junction inverse inductances can be assigned to respective edges of the graph. In one aspect, the assignment of the inverse inductances, conductances, capacitances, and junction inverse inductances can be based on a lumped-element approximation of the quantum circuit system. In various aspects, the assignment of the inverse inductances, conductances, capacitances, and junction inverse inductances to respective edges of the graph can be performed in accordance with and/or using aspects of equation 9 and/or equations 17-18 and related discussions, as described below.

At 606, a coordinate system can be determined based on the graph. In one aspect, the determination of the coordinate system can be performed by operation of a coordinate generating unit executed by the one or more processors. The coordinate generating unit can be implemented, for example, in software, hardware, firmware or a combination of these. In another aspect, the coordinate system can include an arbitrary set of independent coordinates. In some cases, the coordinate generating unit is implemented as a tree generating unit. In one aspect, the determination of the coordinate system can include generating, by operation of a tree generating unit executed by the one or more processors, a spanning tree based on the graph. The tree generating unit can be programmed or otherwise configured to perform operations that generate a spanning tree. For example, the tree generating unit can assign one of the vertices as a root of the graph, the root corresponding to a voltage ground of the quantum circuit system. In one aspect, respective directions can be assigned to the subset of edges of the spanning tree based on the root. In some aspects, the spanning tree can include the subset of the edges of the graph having at least one of inverse inductances that are non-zero or junction inverse inductances that are non-zero. In one aspect, the generation of the spanning tree based on the graph can include performing a breadth-first traversal of the graph from the root. In various aspects, the determination of the graph can be performed in accordance with and/or using aspects of equations 9 and/or equations 17-18 and related discussions, as described below.

At 608, a matrix representation of the system can be generated based on the coordinate system. In various aspects, the generation of the matrix representation of the system can be performed in accordance with and/or using aspects of equations 10 and/or equations 19-20 and related discussions, as described below.

At 610, a Hamiltonian for the quantum circuit system can be determined using the matrix representation. In various aspects, the determination of the Hamiltonian can be performed in accordance with and/or using aspects of equations 11-16 and/or equations 32-35 and related discussions, as described below.

At 612, the quantum circuit system can be simulated based on the Hamiltonian. In one aspect, the lumped-element approximation of the quantum circuit system can include a lossless linear system approximation of the quantum circuit system in which non-linearities are ignored. In one aspect, for such a linear lumped-element approximation, simulating the quantum circuit system based on the Hamiltonian can include diagonalizing the Hamiltonian. In another aspect, for such a linear lumped-element approximation, simulating the quantum circuit system based on the Hamiltonian can include determining eigenmodes, eigenvectors, and eigenvalues of the quantum circuit system.

In another aspect, the lumped-element approximation of the quantum circuit system can include a lossy non-linear system approximation of the quantum circuit system. In one aspect, for such a non-linear lumped-element approximation, simulating the quantum circuit system comprises quantizing the Hamiltonian to generate a first modified Hamiltonian, including Josephson junction tunneling energies to the Hamiltonian to generate a second modified Hamiltonian, and generating a Lindblad master equation based on the second modified Hamiltonian.

In various aspects, the simulation of the quantum circuit system can be performed in accordance with and/or using aspects of equations 15-16 and/or equations 24-28 and 32-25 and related discussions, as described below.

In some aspects, quantum chip simulators may use multi-port impedance matrices using a full-wave electromagnetics solver and treat impedance matrices as a black-box system. However, full-wave driven solvers may take a lot of memory and simulation time for large multi-mode systems. If the result of the full-wave driven solver is used as a black-box, it may be difficult to infer how improve a design based on simulation results. If the simulation of the quantum system disagrees with measured results, it may be difficult to determine how to calibrate the simulation technique.

In some aspects, the disclosure describes an electrostatic capacitance solver as well as a full-wave eigenmode solver to build a lumped element circuit model of the chip. Accordingly, the simulation time can be greatly reduced and the generated circuit model can inform the circuit's structure.

In an aspect, the circuit model comprises a complete graph G with vertices V and edges E=V×V as well as four functions from E→ℝ denoted a, g, c, j. In another aspect, the vertices of the graph can represent distinct pieces of superconductor on the chip and the edges represent an inductance, resistance, capacitance, and Josephson Junction in parallel connecting two vertices. The four functions a, g, c, j can assign, to each edge, its lumped element circuit values in the form of astringence (the inverse of inductance), conductance (the inverse of resistance), capacitance, and junction astringence (the inverse of the Josephson inductance of a Josephson Junction), respectively. In one aspect, astringence, conductance, and junction astringence can be used rather than inductance, resistance and junction inductance because a value of 0 for astringence, conductance, capacitance, or junction astringence can correspond to an open circuit, so these quantities can be analyzed similarly.

In some aspects, to analyze the quantum mechanical system described by such a circuit, the equations of motion can be described. If the magnetic flux between the inductor and capacitor on the edge between vertices v and v' is denoted by $\phi(v,v')$, then the current conservation equation at vertex v can be written as $$\Sigma_{v' \in V} a(v,v')\phi(v,v') + g(v,v')\dot\phi(v,v') + c(v,v')\ddot\phi(v,v') + j(v,v')\phi_0 \sin(\phi(v,v')/\phi_0) = d(v,v') \quad (9)$$

where d is a current drive applied in parallel with edge (v,v') and $\phi_0$ is the reduced flux quantum $\phi_0=\hbar/2e$. This yields a set of |V| equations with |V|(|V|−1)/2 free variables. If these equations are added together over all vertices, the result is 0, meaning that there are only |V|−1 independent equations. Furthermore, these $\phi(v,v')$ variables are not independent as they add to 0 around any loop in the graph. Accordingly, a spanning tree S of G can be defined that contains edges with nonzero astringence or junction astringence. The edges with nonzero astringence or junction astringence can be assumed to be a tree. One vertex of G can be designated to represent the voltage ground and direction can be added to the edges of S to point towards this ground vertex. Using the $\phi$ variables along the edges of S with the directionality defined by the ground, |V|−1 independent variables can be identified among |V|(|V|−1)/2 $\phi$ variables. If $\Phi$ denotes these |V|−1 variables as a column vector, the equations described in (1) can be represented as a matrix equation $$A\Phi + G\dot\Phi + C\ddot\Phi + J\phi_0 \sin(\Phi/\phi_0) = D \quad (10)$$

where A, G, C and J are symmetric |V|−1 dimensional square matrices representing the astringence, conductance, capacitance, and junction astringence dynamics of the circuit, and D is a vector of current drives. In order to find a matrix representation of the equations of motion with symmetric matrices, the equations in equation (9) can be added to each other in a particular way that depends on the choice of spanning tree. In particular, the equations encoded in equation (10) correspond to the sum over all vertices v' above v in the spanning tree of it's equation as represented in equation (9). Because the spanning tree was chosen to go through the edges containing nonzero astringence or junction astringence, A and J are diagonal matrices.

If the dissipative $G\dot\Phi$ term is neglected, this equation can be represented by the Lagrangian $$\mathcal{L}(\Phi,\dot\Phi) = \tfrac{1}{2}\dot\Phi^T C \dot\Phi - \tfrac{1}{2}\Phi^T A \Phi + J\phi_0^2 \cos(\Phi/\phi_0) + D^T\Phi. \quad (11)$$

In one aspect, allowing $$Q = \frac{\partial \mathcal{L}}{\partial \dot\Phi} = C\dot\Phi,$$

the corresponding Hamiltonian can be represented as $$\mathcal{H}(Q,\Phi) = Q^T \dot\Phi - \mathcal{L}(\Phi,\dot\Phi) \quad (12)$$

$$= \tfrac{1}{2}Q^T C^{-1} Q + \tfrac{1}{2}\Phi^T A \Phi - J\phi_0^2 \cos(\Phi/\phi_0) - D^T\Phi. \quad (13)$$

There are several different ways to proceed at this point in analyzing this system.

In one aspect, defining a function $n(x)=\cos(x)+x^2/2$ so that $n(x)$ contains all of the non-quadratic terms of $\cos(x)$, the Hamiltonian becomes $$\mathcal{H}(Q,\Phi) = \tfrac{1}{2}Q^T C^{-1} Q + \tfrac{1}{2}\Phi^T A'\Phi - J\phi_0^2 n(\Phi/\phi_0) - D^T\Phi \quad (14)$$

where $A'=A+J\phi_0^2$. In this representation the first two terms can represent the linear part of the circuit, while the third term can represent the nonlinearity created by the Josephson Junctions and the last term represents the drives.

Further, a canonical coordinate transformation can be made to diagonalize the first two terms of this Hamiltonian. Since $\sqrt{A'}C^{-1}\sqrt{A'}$ represents a symmetric and positive semi-definite matrix, it can be decomposed as $\sqrt{A'}C^{-1}\sqrt{A'}=U^T\Omega^2 U$ where U is an orthogonal matrix and $\Omega$ is a diagonal matrix. In one aspect, coordinates $\Phi'=U^T\sqrt{A'}\Phi$ and $Q'=U\sqrt{A'^{-1}}Q$ can be used so that the Hamiltonian becomes $$\mathcal{H}(Q',\Phi') = \tfrac{1}{2}\Phi'^T \Phi' + \tfrac{1}{2}Q'^T \Omega^2 Q' - J\phi_0^2 n(\sqrt{A'^{-1}}U\Phi'/\phi_0) - D^T\sqrt{A'^{-1}}U\Phi'/\phi_0. \quad (15)$$

Ignoring the nonlinear and drive terms, this Hamiltonian describes a set of |V|−1 independent modes with frequencies given by the diagonal terms of $\Omega/2\pi$. These modes represent the hybridized resonator and qubit modes, making the linear approximation for the Josephson Junctions.

In one aspect, to include the nonlinear terms, the Hamiltonian can be quantized by replacing Q' and $\Phi'$ by operators $\hat Q'$ and $\hat\Phi'$ satisfying $[\hat Q'_\alpha, \hat\Phi'_\beta]=i\hbar\delta_{\alpha,\beta}$. Accordingly, lowering operators $a_\alpha$ can be defined such that $\hat\Phi'_\alpha = \varphi_\alpha(a_\alpha^\dagger + a_\alpha)$ and $\hat Q'_\alpha = iq_\alpha(a_\alpha^\dagger - a_\alpha)$ where $[a_\alpha, a_\beta^\dagger]=\delta_{\alpha,\beta}$ and $\varphi_\alpha=\sqrt{\hbar\omega_\alpha/2}$ and $q_\alpha=\sqrt{\hbar/2\omega_\alpha}$. Finally, substituting these expressions for $\hat\Phi'_\alpha$ and $\hat Q'_\alpha$ into (7) and Taylor expanding n around 0 yields $$\hat{\mathcal{H}}/\hbar = \Sigma_{\alpha=1}^{|V|-1} \omega_\alpha a_\alpha^\dagger a_\alpha + \Sigma_{\alpha=1}^{|V|-1} \Sigma_{\beta=1}^{|V|-1} \chi_{\alpha,\beta} a_\alpha^\dagger a_\beta^\dagger a_\alpha a_\beta + \quad (16)$$

In one aspect, this shows that the quantum nonlinear correction to the classical picture described above implies that the independent modes of the system change in frequency depending on the state of the system. In another aspect, the $\chi_{\alpha,\alpha}$ terms show that mode $\alpha$ changes in frequency when it is in an excited state and the $\chi_{\alpha,\beta}$ terms show that the frequency of mode $\alpha$ changes when mode $\beta$ is in an excited state.

In an aspect, a circuit that describes the quantum chip may be needed to implement the methods described above. In one aspect, the features in the designs can be sub-millimeter whereas the frequencies of interest (3-6 GHz) can correspond to at least 50 mm in wavelength. Therefore the lumped-element approximation can be taken and each separate piece of superconductor in the design can be treated as at one voltage.

Accordingly, an electrostatic capacitance and conductance solver can be used to find the capacitances and conductances between each piece of metal in the design. The solver (for example, Q3d, a solver that is part of the Ansys Electronics Desktop) can inform about the c and g functions described above; however the solver may not inform about a or j.

In one aspect, to find a, it can be noted that a circuit with both capacitance and inductance can have resonant modes. In particular, as shown above, the angular frequencies of these modes are the eigenvalues of $\sqrt{A}C^{-1}\sqrt{A}$ where A and C are the astringence and capacitance matrices of a circuit without Josephson Junctions. By applying an iterative algorithm, a diagonal astringence matrix can be found that matches the eigenmode frequencies of a circuit to given values. In this way, the a function can be found if eigenmode frequencies are known. These frequencies can either be found by using a full-wave eigenmode solver or by experiment.

In one aspect, the last element of the circuit, that is, the junction astringences, j, can be found by probing the Josephson Junctions at room temperature and using the Ambegokar-Baratoff law, which states that the room temperature resistance of a Josephson Junction is proportional to its low temperature Josephson inductance.

In various aspects, the model for simulating the quantum computing system can be alternatively or additionally implemented as follows. In some aspects, the disclosure describes a model that characterizes the low energy structure and dynamics of superconducting circuits with Josephson Junction nonlinearities. In some aspects, the nonlinearities can be assumed to be spatially small so that the system can be described by a linear circuit with Josephson Junctions embedded at particular locations in the circuit. In an aspect, a circuit model can be described that is universal for linear time-invariant systems with a finite number of resonances and ports. By then embedding Josephson Junctions at some of those ports, a Hamiltonian can be generated for the case of a lossless system. Alternatively or additionally, a Lindblad master equation can be generated for the case of a lossy system describing the quantum dynamics of the superconducting circuit.

In some aspects, finite, passive, linear, time-invariant systems can be modelled by circuits consisting of capacitors, resistors and inductors. In another aspect, a circuit can be defined as a complete graph G with vertices V and edges $E=V\times V$ along with three functions from $E\to\mathbb{R}$ denoted a, g, c. The vertices of the graph can represent locations where charge can accumulate and the edges can represent pathways for currents to flow. The three functions a, g and c can assign to each edge of the graph, its lumped element circuit values in the form of astringence (the inverse of inductance), conductance (the inverse of resistance), and capacitance, respectively. In an aspect, astringence and conductance can be used rather than inductance and resistance because a value of zero for astringence and conductance can correspond to an open circuit, such that these quantities can combine algebraically in the same way.

In one aspect, to analyze the dynamics of the circuit, the equations of motion can be described. If the time integral of the voltage between vertices v and v' is denoted by $\phi(v, v')$ then the current conservation equation at vertex v can be written as $$\sum_{v'\in V} a(v,v')+g(v,v')\dot\phi(v,v')+c(v,v')\ddot\phi(v,v')-d(v,v')=0 \quad (17)$$

where d(v, v') is a current drive applied in parallel with edge (v, v'). This yields a set of |v| equations with $|V|(|V|-1)/2$ free variables. In another aspect, if all of the left sides of these equations equations are added together over all vertices, we get 0, meaning that there are actually only $|V|-1$ independent equations. Furthermore, these $\phi(v, v')$ variables are not independent as they add to 0 around any loop in the graph. Accordingly, an arbitrary rooted spanning tree S of G can be chosen, with root r and the $\phi(v, v')$ coordinates along directed edges in this tree can be used as independent coordinates. In one aspect, letting the edges in S be numbered 0 through $|V|-1$ and letting $e_i$ denote the i'th standard basis vector, a function l(v) for $v\in V$ can be defined as the sum of $e_i$ over all edges i in the unique path through S from r to v. Accordingly, $\phi(v, v')=(l(v)-l(v'))\cdot\Phi$ where $\Phi$ is a vector of the independent $\phi$ coordinates. This can be used to rewrite equation (17) as $$\sum_{v'\in V}\left(a(v,v')+g(v,v')\frac{d}{dt}+c(v,v')\frac{d^2}{dt^2}\right) \quad (18)$$
$$(l(v)-l(v'))\cdot\Phi-d(v,v')=0.$$

In another aspect, $|V|\times|V|-1$ matrices $\hat A$, $\hat G$, $\hat C$ can be defined such that the i'th row of $\hat A$ is $\sum_{v'} a(v_i,v')(l(v_i)-l(v'))$ and similarly for $\hat G$, $\hat C$. In one aspect, d(v,v') may be expressed as a $|V|\times 1$ column vector $\hat D$, where the i'th entry is $\sum_{v'\in V} d(v_i,v')$. Equation (17) can therefore be expressed as $$\hat A\Phi+\hat G\dot\Phi+\hat C\ddot\Phi=\hat D \quad (19)$$

However, these |V| equations are still not independent. Accordingly, equation (19) can be left-multiplied by a $|V|-1\times|V|$ matrix T where the i'th column of T is $l(v_i)$. In one aspect, $A=T\hat A$ can be defined and similarly for G, C and D. Equation (19) then becomes $$A\Phi+G\dot\Phi+C\ddot\Phi=D \quad (20)$$

This equation contains the same information as (19) since the columns of T are linearly independent except for one column corresponding to the root of the tree, which is 0. Furthermore, the matrices A, G and C are symmetric as can be seen by writing equation (20) as a double sum over vertices. Let $\alpha$, $\beta$ index the edges of S and i,j index the vertices of the circuit. Then $$A_{\alpha,\beta}=\sum_i T_{\alpha,i}\hat A_{i,\beta} \quad (21)$$

$$=\sum_{i,j} l(v_i)_\alpha a(v_i,v_j)(l(v_i)_\beta-l(v_j)_\beta) \quad (22)$$

$$=\frac{1}{2}\sum_{i,j}\left[(l(v_i)_\alpha-l(v_j)_\alpha)a(v_i,v_j)(l(v_i)_\beta-l(v_j)_\beta)\right] \quad (23)$$

which is symmetric. The same calculation applies to G and C. The triple of matrices A, G, C, associated to the the differential equation (20), can be referred to as an AGC model.

In various aspects, the above description indicates that the equations of motion for any circuit can be expressed with three symmetric matrices as in equation (20). Accordingly, the transfer functions of the circuit can be related to the A, G and C matrices. In one aspect, $\Phi$ are time integrals of voltages across edges in S so $U=\dot\Phi$ are voltages across edges in S. In one aspect, a Laplace transform of equation (20) can be taken using $\tilde U$ and $\tilde D$ as the Laplace transforms of U and D. Thus, $$\left(\frac{A}{s}+G+Cs\right)\tilde U=\tilde D \quad (24)$$

so that $$Y(s) = \frac{A}{s} + G + Cs \qquad (25)$$

can represent the admittance matrix of the circuit, mapping voltages on edges of S to currents on edges of S. However, it can be useful to find transfer functions for a different set of edges in G. Suppose a list L of edges of G can be obtained. A matrix k can be defined where the i'th column is $l(v_i)-l(v'_i)$ where $(v_i, v'_i)$ is the i'th edge of L. Then if $\tilde{I}$ are the current drives on the edges in L, $\tilde{D}=k\tilde{I}$ and also that the voltages on the edges in L are $k^T\Phi$. It follows that $$k^T\tilde{U} = k^T\left(\frac{A}{s} + G + Cs\right)^{-1} k\tilde{I} \qquad (26)$$

so that $$Z(s) = k^T\left(\frac{A}{s} + G + Cs\right)^{-1} k \qquad (27)$$

can represent the impedance matrix for the ports in L. From this equation, the admittance and scattering matrices for ports in L can also be derived.

Finally, the complex eigenmodes of the circuit without drive can be derived. In one aspect, supposing that $\dot{\Phi}=V\Phi$ is taken as an ansatz in equation (20) with D=0. Then $$A+GV+CV^2=0 \qquad (28)$$

which can be solved with standard techniques. Further, $\Phi=\exp(Vt)\Phi_0$, so if V is diagonalizable then the eigenvectors of V can represent the eigenmodes of the system and the associated eigenvalues can yield the resonant frequencies and decay constants as their imaginary and real parts. More precisely, the imaginary part of the eigenvalue can represent the angular frequency of the resonance, and the real part of the eigenvalue can represent $-\frac{1}{2}$ times the decay rate in angular frequency units.

In one aspect, AGC models can be embedded into circuits. In another aspect, the mapping in equation (23) from edge value matrices to AGC matrices can be written as a four-index tensor $\Lambda$.

$$\Lambda_{\alpha,\beta}{}^{i,j}=(l(v_i)_\alpha-l(v_j)_\alpha)(l(v_i)_\beta-l(v_j)_\beta) \qquad (29)$$

Contracting $\Lambda$ with the matrix $a_{i,j}:=\frac{1}{2}a(v_i, v_j)$ can yield $A_{\alpha,\beta}$, and likewise for G and C. However, a tensor $\Lambda'$ can also be determined that inverts the action of $\Lambda$ on the space of positive-semi definite matrices like those of the AGC model. By contracting the model matrices with $\Lambda'$, lumped circuit elements can be recovered for a circuit that has the same dynamics as the model. For example, for a spanning tree in which each vertex is distance one from the root, the root can be vertex $|V|$ and the edge a can be from the root to vertex $\alpha$. Then, $$A_{\alpha,\beta} = \begin{pmatrix} -a(\alpha, \beta), & \text{for } \alpha \neq \beta \\ \sum_{\gamma \neq \alpha} a(\alpha, \gamma), & \text{for } \alpha = \beta \end{pmatrix} \qquad (30)$$

and therefore $$a(\alpha, \beta) = \begin{pmatrix} -A(\alpha, \beta), & \text{for } \beta \neq |V| \\ \sum_{\gamma \neq |V|} A(\alpha, \gamma), & \text{for } \beta = |V|. \end{pmatrix} \qquad (31)$$

This ability to map between circuit and AGC representations of a linear system allows ACG models to be cascaded by embedding them in circuits and identifying the circuits at specified ports.

In one aspect, the AGC model can be quantized and Josephson Junctions can be included in the model. In another aspect, if G=0 such the system is lossless, equation (20) can be represented by a Lagrangian $$\mathcal{L}(\Phi,\dot{\Phi})=\tfrac{1}{2}\dot{\Phi}^T C\dot{\Phi}-\tfrac{1}{2}\Phi^T A\Phi+D^T\Phi. \qquad (32)$$

In one aspect, $$Q = \frac{\partial \mathcal{L}}{\partial \dot{\Phi}} = C\dot{\Phi}$$

so the corresponding Hamiltonian is $$\mathcal{H}(Q, \Phi) = Q^T\dot{\Phi} - \mathcal{L}(\Phi, \dot{\Phi}) \qquad (33)$$

$$= \frac{1}{2}Q^T C^{-1} Q + \frac{1}{2}\Phi^T A\Phi - D^T\Phi \qquad (34)$$

which can represent a system of coupled linear oscillators driven by D. The effects of Josephson Junctions can then be added, since their tunneling energy can be added to the Hamiltonian. For a collection of Josephson Junctions where junction i has tunneling energy $E_{J,i}$ and is on the edge $(v_i, v'_i)$, the full Hamiltonian is $$\mathcal{H}(Q, \Phi) = \qquad (35)$$
$$\frac{1}{2}Q^T C^{-1} Q + \frac{1}{2}\Phi^T A\Phi - D^T\Phi - \sum_i E_{J,i}\cos\left(\frac{(l(v_i) - l(v'_i)) \cdot \Phi}{\phi_0}\right)$$

where $\phi_0=\hbar/2e$ can represent the reduced flux quantum. In one aspect, if there are several junctions in a loop, the enclosed magnetic flux can represent a variable that can be used to tune the Hamiltonian. This magnetic flux can enter as a constant offset in the cosine term of one of the junctions in the loop. In one aspect, a Lindblad master equation can be generated such that in the $E_{J,i}\to 0$ limit, the Heisenberg equations of motion for the $\Phi$ variables matches that in equation (20). This master equation can incorporates the linear, nonlinear, and quantum effects present in the model.

Accordingly, as described herein, a mathematical framework can be described that allows a superconducting circuit to be modelled transparently as an arbitrary passive linear system coupled to Josephson Junction nonlinearities. The model can be analyzed to obtain linear properties such as transfer functions, and also nonlinear properties such as quantized energy levels and relaxation rates. Furthermore, the system can be modularly specified because of its cascading construction.

In some aspects, this system offers several advantages over other approaches to superconducting circuit analysis. In particular, the model can be created modularly from pieces like lumped element resonators, transmission lines, and transmon qubits. This can permit a simulation of circuit operations under ideal conditions, for example, in the absence of unwanted couplings. In another aspect, the model can be arbitrarily reflective of measurements or full-wave simulation using passive macromodelling techniques such as the Vector-Fitting algorithm. This can permit a determination of how well a real layout will perform. In another aspect, the model makes clear the relationships and tradeoffs between circuit properties such as Rabi rates, measurement times, and decay rates, and the like for use in superconducting circuit design. In one aspect, the model creates a framework in which circuit QED inquires can be made; for example, the model can be used to determine what unitary operations can be generated with two Josephson Junctions, four linear poles, and one port.

In various implementation, a computer-implemented simulation method can be described. In one aspect, the method can include: generating, by operation of a graph generating unit executed by one or more processors, a graph representing a quantum circuit system. In another aspect, the graph includes vertices and edges, the edges representing circuit elements of the quantum circuit system and the vertices representing physical connections between the circuit elements of the quantum circuit system. In various aspects, the method further includes: storing the graph in first memory; assigning, to the graph stored in the first memory, inverse inductances, conductances, capacitances, and junction inverse inductances to respective edges of the graph based on a lumped-element approximation of the quantum circuit system; providing a system of equations of motion representing current in the quantum circuit system; generating, by operation of a tree generating unit executed by the one or more processors, a spanning tree based on the graph; storing the spanning tree in second memory; generating a matrix representation of the system of equations of motion based on the spanning tree; and simulating the quantum circuit system based on the matrix representation.

In one aspect, the spanning tree includes the subset of the edges of the graph having at least one of (i) inverse inductances that can be non-zero or (ii) junction inverse inductances that can be non-zero. In another aspect, generating the spanning tree based on the graph can include: assigning, by operation of the tree generating unit, one of the vertices as a root of the graph, the root corresponding to a voltage ground of the quantum circuit system; and assigning, based on the root, respective directions to the subset of edges of the spanning tree. In another aspect, generating the spanning tree based on the graph can include performing a breadth-first traversal of the graph from the root.

In one aspect, the circuit elements can include one or more of (i) a qubit device, (ii) a resonator device, (iii) a coupler device, (iv) a capacitance, (v) an impedance, (vi) an inductance, (vii) a current source, (viii) a voltage source, or (ix) an external system.

In some aspects, assigning inverse inductances, conductances, capacitances, and junction inverse inductances to respective edges of the graph can include assigning inverse inductances, conductances, capacitances, and junction inverse inductances to respective edges of the graph based on a physical measurement of the quantum circuit system.

In one aspect, the method can include determining (i) an operating frequency, (ii) a dispersive shift, (iii) an anharmonicity, (iv) a coherence time shift, (v) a lamb shift, or (vi) a decay rate of the quantum circuit system based on the simulation of the quantum circuit system. In some aspects, the method can further include determining a transfer function of the quantum circuit system based on the simulation of the quantum circuit system.

In another aspect, the simulating the quantum circuit system based on the matrix representation can further include simulating quantum dynamics of the quantum circuit system based on a Lindblad master equation. In one aspect, the simulating the quantum circuit system based on the matrix representation can further include solving a Hamiltonian of a static quantum circuit system.

In various aspects, a computer-implemented simulation method is performed. In one aspect, the computer-implemented simulation method can include: generating, by operation of a graph generating unit executed by one or more processors, a graph representing a quantum circuit system. In another aspect, the graph includes vertices and edges, the edges representing circuit elements of the quantum circuit system and the vertices representing physical connections between the circuit elements of the quantum circuit system. In one aspect, the computer-implemented simulation method can further include: assigning, to the graph, inverse inductances, conductances, capacitances, and junction inverse inductances to respective edges of the graph based on a lumped-element approximation of the quantum circuit system; determining, by operation of a coordinate generating unit executed by the one or more processors, a coordinate system based on the graph; generating a matrix representation of the system based on the coordinate system; determining a Hamiltonian for the quantum circuit system using the matrix representation; and simulating the quantum circuit system based on the Hamiltonian.

In one aspect, the coordinate system can include an arbitrary set of independent coordinates. In another aspect, the lumped-element approximation of the quantum circuit system can include a lossless linear system approximation of the quantum circuit system in which non-linearities can be ignored. In one aspect, the simulating the quantum circuit system based on the Hamiltonian can include diagonalizing the Hamiltonian. In one aspect, the simulating the quantum circuit system based on the Hamiltonian can include determining eigenmodes, eigenvectors, and eigenvalues of the quantum circuit system.

In some aspects, the lumped-element approximation of the quantum circuit system can include a lossy non-linear system approximation of the quantum circuit system. In one aspect, simulating the quantum circuit system based on the Hamiltonian can include quantizing the Hamiltonian to generate a first modified Hamiltonian, including Josephson junction tunneling energies to the Hamiltonian to generate a second modified Hamiltonian, and generating a Lindblad master equation based on the second modified Hamiltonian.

In some aspects, a non-transitory computer-readable medium storing computer-executable instructions is described. In another aspect, when executed by one or more processors, the computer-executable instructions cause the one or more processors to perform operations comprising: generating, by operation of a graph generating unit executed by the one or more processors, a graph representing a quantum circuit system, wherein the graph includes vertices and edges, the edges representing circuit elements of the quantum circuit system and the vertices representing physical connections between the circuit elements of the quantum circuit system; assigning, to the graph, inverse inductances, conductances, capacitances, and junction inverse inductances to respective edges of the graph based on a lumped-element approximation of the quantum circuit system; determining, by operation of a coordinate generating unit executed by the one or more processors, a coordinate system based on the graph; generating a matrix representation of the system based on the coordinate system; determining a Hamiltonian for the quantum circuit system using the matrix representation; and simulating the quantum circuit system based on the Hamiltonian.

In one aspect, the coordinate system can include an arbitrary set of independent coordinates. In another aspect, the computer-executable instructions to determine the coordinate system can include computer-executable instructions to perform operations comprising: generating, by operation of a tree generating unit executed by the one or more processors, a spanning tree based on the graph; assigning, by operation of the tree generating unit, one of the vertices as a root of the graph, the root corresponding to a voltage ground of the quantum circuit system; and assigning, based on the root, respective directions to the subset of edges of the spanning tree. In one aspect, the spanning tree can include the subset of the edges of the graph having at least one of (i) inverse inductances that can be non-zero or (ii) junction inverse inductances that can be non-zero. In one aspect, the computer-executable instructions to generate the spanning tree based on the graph can include computer-executable instructions to perform and operation comprising: performing a breadth-first traversal of the graph from the root.

In another aspect, the lumped-element approximation of the quantum circuit system can include a lossless linear system approximation of the quantum circuit system in which non-linearities can be ignored. In one aspect, the computer-executable instructions to simulate the quantum circuit system based on the Hamiltonian can include computer-executable instructions to diagonalize the Hamiltonian. In one aspect, the computer-executable instructions to simulate the quantum circuit system based on the Hamiltonian can include computer-executable instructions to determine eigenmodes, eigenvectors, and eigenvalues of the quantum circuit system.

In one aspect, the lumped-element approximation of the quantum circuit system can include a lossy non-linear system approximation of the quantum circuit system. In another aspect, the computer-executable instructions to simulate the quantum circuit system based on the Hamiltonian can further include computer-executable instructions to quantize the Hamiltonian to generate a first modified Hamiltonian, including Josephson junction tunneling energies to the Hamiltonian to generate a second modified Hamiltonian, and generating a Lindblad master equation based on the second modified Hamiltonian.

In some aspects, a computer system is described. In one aspect, the computer system can include: at least one memory that stores computer-executable instructions; and one or more processors configured to access the at least one memory, wherein the one or more processors can be configured to execute the computer-executable instructions to: generate, by operation of a graph generating unit executed by the one or more processors, a graph representing a quantum circuit system, wherein the graph includes vertices and edges, the edges representing circuit elements of the quantum circuit system and the vertices representing physical connections between the circuit elements of the quantum circuit system; assign, to the graph, inverse inductances, conductances, capacitances, and junction inverse inductances to respective edges of the graph based on a lumped-element approximation of the quantum circuit system; determine, by operation of a coordinate generating unit executed by the one or more processors, a coordinate system based on the graph; generate a matrix representation of the system based on the coordinate system; determine a Hamiltonian for the quantum circuit system using the matrix representation; and simulate the quantum circuit system based on the Hamiltonian.

In one aspect, the coordinate system can include an arbitrary set of independent coordinates. In another aspect, the computer-executable instructions to determine the coordinate system can include computer-executable instructions to: generate, by operation of a tree generating unit executed by the one or more processors, a spanning tree based on the graph; assign, by operation of the tree generating unit, one of the vertices as a root of the graph, the root corresponding to a voltage ground of the quantum circuit system; and assign, based on the root, respective directions to the subset of edges of the spanning tree. In one aspect, the spanning tree can include the subset of the edges of the graph having at least one of (i) inverse inductances that can be non-zero or (ii) junction inverse inductances that can be non-zero. In another aspect, the computer-executable instructions to generate the spanning tree based on the graph can include computer-executable instructions to perform a breadth-first traversal of the graph from the root.

In one aspect, the lumped-element approximation of the quantum circuit system can include a lossless linear system approximation of the quantum circuit system in which non-linearities can be ignored. In another aspect, the computer-executable instructions to simulate the quantum circuit system based on the Hamiltonian can include computer-executable instructions to diagonalize the Hamiltonian. In one aspect, the computer-executable instructions to simulate the quantum circuit system based on the Hamiltonian can include computer-executable instructions to determine eigenmodes, eigenvectors, and eigenvalues of the quantum circuit system. In another aspect, the lumped-element approximation of the quantum circuit system can include a lossy non-linear system approximation of the quantum circuit system. In one aspect, the computer-executable instructions to simulate the quantum circuit system based on the Hamiltonian can include computer-executable instructions to quantize the Hamiltonian to generate a first modified Hamiltonian, include Josephson junction tunneling energies to the Hamiltonian to generate a second modified Hamiltonian, and generate a Lindblad master equation based on the second modified Hamiltonian.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A computer-implemented simulation method comprising:
   generating, by operation of a graph generating unit executed by one or more processors, a graph representing a quantum circuit system, wherein the graph includes vertices and edges, the edges representing circuit elements of the quantum circuit system and the vertices representing physical connections between the circuit elements of the quantum circuit system;
   storing the graph in first memory;
   assigning, to the graph stored in the first memory, inverse inductances, conductances, capacitances, and junction inverse inductances to respective edges of the graph based on a lumped-element approximation of the quantum circuit system;

providing a system of equations of motion representing current in the quantum circuit system;

generating, by operation of a tree generating unit executed by the one or more processors, a spanning tree based on the graph;

storing the spanning tree in second memory;

generating a matrix representation of the system of equations of motion based on the spanning tree; and simulating the quantum circuit system based on the matrix representation.

2. The method of claim 1, wherein the spanning tree comprises the subset of the edges of the graph having at least one of (i) inverse inductances that are non-zero or (ii) junction inverse inductances that are non-zero.

3. The method of claim 1, wherein generating the spanning tree based on the graph comprises:

assigning, by operation of the tree generating unit, one of the vertices as a root of the graph, the root corresponding to a voltage ground of the quantum circuit system; and assigning, based on the root, respective directions to the subset of edges of the spanning tree.

4. The method of claim 3, wherein generating the spanning tree based on the graph further comprises performing a breadth-first traversal of the graph from the root.

5. The method of claim 1, wherein the circuit elements comprise one of, or parallel combinations of two or more of, a capacitance, an inductance, a conductance, a Josephson junction, a current source, a voltage source and a sub-circuit.

6. The method of claim 1, wherein assigning inverse inductances, conductances, capacitances, and junction inverse inductances to respective edges of the graph comprises assigning inverse inductances, conductances, capacitances, and junction inverse inductances to respective edges of the graph based on a physical measurement of the quantum circuit system.

7. The method of claim 1, further comprising determining (i) an operating frequency, (ii) a dispersive shift, (iii) an anharmonicity, (iv) a coherence time shift, (v) a lamb shift, or (vi) a decay rate of the quantum circuit system based on the simulation of the quantum circuit system.

8. The method of claim 1, further comprising determining a transfer function of the quantum circuit system based on the simulation of the quantum circuit system.

9. The method of claim 1, wherein simulating the quantum circuit system based on the matrix representation further comprises simulating quantum dynamics of the quantum circuit system based on a Lindblad master equation.

10. The method of claim 1, wherein simulating the quantum circuit system based on the matrix representation further comprises solving a Hamiltonian of a static quantum circuit system.

11. The method of claim 1, wherein simulating the quantum circuit system comprises determining complex eigenmodes, eigenvectors, and eigenvalues of the quantum circuit system.

12. The method of claim 1, further comprising determining resonant frequencies of the quantum circuit system based on the simulation of the quantum circuit system.

13. A computer-implemented simulation method comprising:

generating, by operation of a graph generating unit executed by one or more processors, a graph representing a quantum circuit system, wherein the graph includes vertices and edges, the edges representing circuit elements of the quantum circuit system and the vertices representing physical connections between the circuit elements of the quantum circuit system;

assigning, to the graph, inverse inductances, conductances, capacitances, and junction inverse inductances to respective edges of the graph based on a lumped-element approximation of the quantum circuit system;

determining, by operation of a coordinate generating unit executed by the one or more processors, a coordinate system based on the graph;

generating a matrix representation of the quantum circuit system based on the coordinate system;

determining a Hamiltonian for the quantum circuit system using the matrix representation; and simulating the quantum circuit system based on the Hamiltonian.

14. The method of claim 13, wherein the coordinate system comprises an arbitrary set of independent coordinates.

15. The method of claim 13, wherein the lumped-element approximation of the quantum circuit system comprises a lossless linear system approximation of the quantum circuit system in which non-linearities are ignored.

16. The method of claim 15, wherein simulating the quantum circuit system comprises diagonalizing the Hamiltonian.

17. The method of claim 15, wherein simulating the quantum circuit system comprises determining eigenmodes, eigenvectors, and eigenvalues of the quantum circuit system.

18. The method of claim 13, wherein the lumped-element approximation of the quantum circuit system comprises a lossy non-linear system approximation of the quantum circuit system.

19. The method of claim 18, wherein simulating the quantum circuit system comprises:

quantizing the Hamiltonian to generate a first modified Hamiltonian;

including Josephson junction tunneling energies in the Hamiltonian to generate a second modified Hamiltonian; and generating a Lindblad master equation based on the second modified Hamiltonian.

20. A non-transitory computer-readable medium storing computer-executable instructions which, when executed by one or more processors, cause the one or more processors to perform operations comprising:

generating a graph representing a quantum circuit system, wherein the graph includes vertices and edges, the edges representing circuit elements of the quantum circuit system and the vertices representing physical connections between the circuit elements of the quantum circuit system;

assigning, to the graph, inverse inductances, conductances, capacitances, and junction inverse inductances to respective edges of the graph based on a lumped-element approximation of the quantum circuit system;

determining a coordinate system based on the graph;

generating a matrix representation of the system based on the coordinate system;

determining a Hamiltonian for the quantum circuit system using the matrix representation; and simulating the quantum circuit system based on the Hamiltonian.

21. The non-transitory computer-readable medium of claim 20, wherein the coordinate system comprises an arbitrary set of independent coordinates.

22. The non-transitory computer-readable medium of claim 20, wherein the computer-executable instructions to determine the coordinate system comprise computer-executable instructions to perform operations comprising:
generating a spanning tree based on the graph;
assigning one of the vertices as a root of the graph, the root corresponding to a voltage ground of the quantum circuit system; and
assigning, based on the root, respective directions to the subset of edges of the spanning tree.

23. The non-transitory computer-readable medium of claim 22, wherein the spanning tree comprises the subset of the edges of the graph having at least one of (i) inverse inductances that are non-zero or (ii) junction inverse inductances that are non-zero.

24. The non-transitory computer-readable medium of claim 22, wherein the computer-executable instructions to generate the spanning tree based on the graph comprise computer-executable instructions to perform a breadth-first traversal of the graph from the root.

25. The non-transitory computer-readable medium of claim 20, wherein the lumped-element approximation of the quantum circuit system comprises a lossless linear system approximation of the quantum circuit system in which non-linearities are ignored.

26. The non-transitory computer-readable medium of claim 25, wherein the computer-executable instructions to simulate the quantum circuit system based on the Hamiltonian comprise computer-executable instructions to diagonalize the Hamiltonian.

27. The non-transitory computer-readable medium of claim 25, wherein the computer-executable instructions to simulate the quantum circuit system based on the Hamiltonian comprise computer-executable instructions to determine eigenmodes, eigenvectors, and eigenvalues of the quantum circuit system.

28. The non-transitory computer-readable medium of claim 19, wherein the lumped-element approximation of the quantum circuit system comprises a lossy non-linear system approximation of the quantum circuit system.

29. The non-transitory computer-readable medium of claim 28, wherein the computer-executable instructions to simulate the quantum circuit system based on the Hamiltonian further comprise computer-executable instructions to:
quantize the Hamiltonian to generate a first modified Hamiltonian;
include Josephson junction tunneling energies in the Hamiltonian to generate a second modified Hamiltonian; and
generate a Lindblad master equation based on the second modified Hamiltonian.

30. A computer system comprising:
memory that stores computer-executable instructions; and
one or more processors configured to access the memory, wherein the one or more processors are configured to execute the computer-executable instructions to:
generate a graph representing a quantum circuit system, wherein the graph includes vertices and edges, the edges representing circuit elements of the quantum circuit system and the vertices representing physical connections between the circuit elements of the quantum circuit system;
assign, to the graph, inverse inductances, conductances, capacitances, and junction inverse inductances to respective edges of the graph based on a lumped-element approximation of the quantum circuit system;
determine a coordinate system based on the graph;
generate a matrix representation of the system based on the coordinate system;
determine a Hamiltonian for the quantum circuit system using the matrix representation; and
simulate the quantum circuit system based on the Hamiltonian.

31. The computer system of claim 30, wherein the coordinate system comprises an arbitrary set of independent coordinates.

32. The computer system of claim 30, wherein the computer-executable instructions to determine the coordinate system comprise computer-executable instructions to:
generate a spanning tree based on the graph;
assign one of the vertices as a root of the graph, the root corresponding to a voltage ground of the quantum circuit system; and
assign, based on the root, respective directions to the subset of edges of the spanning tree.

33. The computer system of claim 32, wherein the spanning tree comprises the subset of the edges of the graph having at least one of (i) inverse inductances that are non-zero or (ii) junction inverse inductances that are non-zero.

34. The computer system of claim 32, wherein the computer-executable instructions to generate the spanning tree based on the graph comprises computer-executable instructions to perform a breadth-first traversal of the graph from the root.

35. The computer system of claim 30, wherein the lumped-element approximation of the quantum circuit system comprises a lossless linear system approximation of the quantum circuit system in which non-linearities are ignored.

36. The computer system of claim 35, wherein the computer-executable instructions to simulate the quantum circuit system based on the Hamiltonian comprise computer-executable instructions to diagonalize the Hamiltonian.

37. The computer system of claim 35, wherein the computer-executable instructions to simulate the quantum circuit system based on the Hamiltonian comprise computer-executable instructions to determine eigenmodes, eigenvectors, and eigenvalues of the quantum circuit system.

38. The computer system of claim 30, wherein the lumped-element approximation of the quantum circuit system comprises a lossy non-linear system approximation of the quantum circuit system.

39. The computer system of claim 38, wherein the computer-executable instructions to simulate the quantum circuit system based on the Hamiltonian comprise computer-executable instructions to:
quantize the Hamiltonian to generate a first modified Hamiltonian;
include Josephson junction tunneling energies in the Hamiltonian to generate a second modified Hamiltonian; and
generate a Lindblad master equation based on the second modified Hamiltonian.

* * * * *